US007313288B2

(12) United States Patent
Dierickx

(10) Patent No.: US 7,313,288 B2
(45) Date of Patent: Dec. 25, 2007

(54) DEFECT PIXEL CORRECTION IN AN IMAGE SENSOR

(75) Inventor: Bart Dierickx, Edegem (BE)

(73) Assignee: Cypress Semiconductor Corporation, San Jose, CA (US)

( * ) Notice: Subject to any disclaimer, the term of this patent is extended or adjusted under 35 U.S.C. 154(b) by 370 days.

(21) Appl. No.: 11/111,287

(22) Filed: Apr. 20, 2005

(65) Prior Publication Data

US 2006/0239580 A1    Oct. 26, 2006

(51) Int. Cl.
G06K 9/40 (2006.01)
G06K 9/00 (2006.01)
G06K 9/32 (2006.01)

(52) U.S. Cl. .................. 382/274; 382/149
(58) Field of Classification Search ............. 382/149, 382/162, 164, 165, 167, 219, 272, 260–264, 382/274–277; 348/246; 358/515, 518
See application file for complete search history.

(56) References Cited

U.S. PATENT DOCUMENTS

| | | | |
|---|---|---|---|
| 5,321,528 A | | 6/1994 | Nakamura |
| 5,608,204 A | | 3/1997 | Hofflinger et al. |
| 6,091,847 A | * | 7/2000 | Chiu et al. .................. 382/149 |
| 6,728,483 B1 | * | 4/2004 | Smart et al. ................ 396/311 |
| 6,816,625 B2 | * | 11/2004 | Lewis et al. ................ 382/275 |
| 7,092,628 B2 | * | 8/2006 | Lawther et al. ............. 396/311 |
| 7,199,824 B2 | * | 4/2007 | Chang et al. ............... 348/246 |
| 7,206,012 B2 | * | 4/2007 | Cook et al. ................. 347/234 |
| 7,206,461 B2 | * | 4/2007 | Steinberg et al. ........... 382/274 |
| 2006/0115149 A1 | * | 6/2006 | Van Der Heide ........... 382/167 |
| 2006/0239580 A1 | * | 10/2006 | Dierickx ..................... 382/274 |

FOREIGN PATENT DOCUMENTS

| | | |
|---|---|---|
| EP | 0260954 | 3/1988 |
| EP | 0481373 | 4/1992 |
| EP | 0739039 | 10/1996 |
| EP | 0773669 | 5/1997 |
| WO | WO93/19489 | 9/1993 |
| WO | WO99/16238 | 4/1999 |

OTHER PUBLICATIONS

G. Meynants, B. Dierickx, "A circuit for the correction of pixel defects in image sensors", ESSCIRC, Den Haag, Sep. 22-24, 1998; published in Proc. ESSCIRC'98, pp. 312-315, 1998.
W.J. Martin et al., "Dynamic Offset Null" IBM Technical Disclosure Bulletin, vol. 23, No. 9, 2/81, p. 4195/4196 XP002052268.
Bart Dierickx, Guy Meynants, "Missing pixel correction algorithm for image sensors", www.http://www.imec.be/bo, Europto-SPIE/AFPAEC, May 18-21, 1998, Zurich, CH. Version Apr. 9, 1998, printed on May 15, 1998, 3:49 p.m.
Roland Perko et al., "Geometrical Accuracy of Bayer Pattern Images", Conference Proceedings ISBN 80-903100-7-9, WSCG2005, Jan. 31-Feb. 4, 2005, Plzen, Czech Republic.
Bart Dierickx et al., "Random addressable active pixel image sensors", SPIE vol. 2950, 0-8194-2354-8/96.

* cited by examiner

Primary Examiner—Amir Alavi
(74) Attorney, Agent, or Firm—Blakely, Sokoloff, Taylor & Zafman LLP

(57) ABSTRACT

A method and apparatus for defect pixel correction in an image sensor. The method may include calculating a median of extrapolated values of right neighboring and left neighboring pixel values of a potentially defective pixel.

20 Claims, 6 Drawing Sheets

DEFECT PIXEL CORRECTION IN AN IMAGE SENSOR

TECHNICAL FIELD

The present invention relates generally to an image sensor and, more particularly, to correction of a defective pixel in an image sensor.

BACKGROUND

Solid-state image sensors have found widespread use in camera systems. The solid-state imager sensors in some camera systems are composed of a matrix of photosensitive elements in series with switching and amplifying elements. The photosensitive sensitive elements may be, for example, photoreceptors, photo-diodes, phototransistors, CCD gate, or alike. Each photosensitive element receives an image of a portion of a scene being imaged. A photosensitive element along with its accompanying electronics is called a picture element or pixel. The image obtaining photosensitive elements produce an electrical signal indicative of the light intensity of the image. The electrical signal of a photosensitive element is typically a current, which is proportional to the amount of electromagnetic radiation (light) falling onto that photosensitive element.

Of the image sensors implemented in a CMOS- or MOS-technology, image sensors with passive pixels and image sensors with active pixels are distinguished. The difference between these two types of pixel structures is that an active pixel amplifies the charge that is collect on its photosensitive element. A passive pixel does not perform signal amplification and requires a charge sensitive amplifier that is not integrated in the pixel.

One of the more important specifications of an image sensor is the cosmetic quality. A sensor's image should be ideally flawless. Unfortunately, image sensor technology is not perfect. Due to processing imperfections, statistics, etc., a finite number of pixels in a sensor array will be defective or yield a signal that deviates visibly from the exact pixel value. Such faults appear as white or black or gray points in the image. This type of pixel fault is referred to as an isolated defect pixel. For a human observer, these tend to be much more annoying than other image imperfections as temporal noise, a mild fixed pattern, or imperfect registrations of color or gray values.

One method to cancel these spots is to store a list of defective pixels and of their positions in the image in a memory of the image sensor. In an image processing step, the isolated pixel value is then replaced by, for example, the average of the surrounding pixels stored in the memory. This method is viable, but has the disadvantage that it requires a memory in the image sensor that would require additional silicon area and added expense. Moreover, it cannot handle isolated pixel values that appear intermittently or only in certain cases. A good example is a so-called dark current pixel. Such pixels will appear when the sensor is at elevated temperatures, yet behave normal at lower temperatures.

Other methods to cancel isolated pixels faults have been proposed, e.g., the spatial median filter or other types of Kalman filters can be used to remove such isolated faults. Unfortunately, such filters also remove useful detail from the image. Consider the image of a star covered sky with an image sensor that has some faulty pixels that appear white. The above noted filters are not able to remove the white point due to faults, and leave the white points that are stars untouched.

Another conventional way to correct for isolated defect pixels in a black and white sensors is described in B. Dierickx, G. Meynants, "Missing pixel correction Algorithm for image sensors," AFPAEC Euroopto/SPIE, Zurich 18-21 may 1998; proc. SPIE vol. 3410, pp. 200-203, 1998 and WO 99/16238. The missing pixel correction algorithm described therein is, in essence, a small kernel non-linear filter that is based on the prediction of the allowed range of gray values for a pixel, from the gray values of the neighborhood of that pixel. One difficulty with such an algorithm is that it may not be suitable for use with mosaic color image sensors because the algorithm may not be able to distinguish between defect pixels and pixels with a deviation response due to the color of the scene.

In a "raw" color image sensor's image, each pixel yields only one color component (red, green or blue). The process to generate all color components for each pixel in a color image is a reconstruction process called demosaicing. In a demosaicing process, the color information in the defective pixel is interpolated to get a complete color image. One problem with conventional demosaicing processes is that the information of the defect pixels is spreading to become false color information in the neighboring pixels.

BRIEF DESCRIPTION OF THE DRAWINGS

The present invention is illustrated by way of example, and not by way of limitation, in the figures of the accompanying drawings in which.

DETAILED DESCRIPTION

Figure 1:
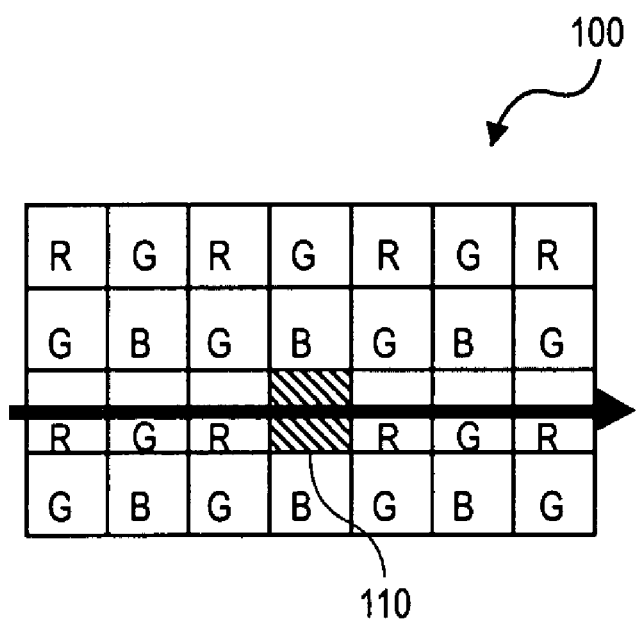
FIG. 1 is a top view illustrating an example of a Bayer pattern scheme in a color image having a defective pixel.

In the following description, numerous specific details are set forth, such as examples of specific commands, named components, connections, number of frames, etc., in order to provide a thorough understanding of embodiments of the present invention. It will be apparent, however, to one skilled in the art that embodiments of present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention.

Some portions of the description that follow are presented in terms of algorithms and symbolic representations of operations on data that may be stored within a memory and operated on by a processor. These algorithmic descriptions and representations are the means used by those skilled in the art to effectively convey their work. An algorithm is generally conceived to be a self-consistent sequence of acts leading to a desired result. The acts are those requiring manipulation of quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, parameters, or the like.

The following detailed description includes algorithms, which will be described below. These algorithms may be implemented by hardware (e.g., analog and/or digital), firmware, or software as embodied in machine-executable instructions, which may be used to cause a general-purpose or special-purpose processor programmed with the instructions to perform the operations described herein. Alternatively, the operations may be performed by a combination of hardware, firmware, and software. The term "coupled to" as used herein may mean coupled directly to or indirectly to through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines, and each of the single signal lines may alternatively be buses. The terms "first," "second," "third," "fourth," "fifth," "sixth" and "seventh" as used herein are meant as labels to distinguish among different pixels and do not have an ordinal meaning according to their numerical designation unless otherwise noted.

A method and apparatus for defect pixel correction in an image sensor is described. Although discussed at times in relation to a color image sensor, the methods and apparatus discussed herein can also be used to correct defective pixels in a black and white image.

A color image sensor (e.g., image sensor 1000 discussed below in relation to FIG. 4) may be used to sample the color spectrum using, in one embodiment, a CCD array overlaid by a color filter array (CFA) such that each pixel samples only one color channel (i.e., every pixel only records one color instead of three). The result is a mosaic of color samples that is referred to as a Bayer pattern. The Bayer pattern scheme results in 25% red, 25% blue and 50% green coverage of the pixel matrix. It should be noted that although embodiments of the present invention may be discussed at times in relation to a Bayer pattern, the method and apparatus described herein may be adapted for use with various other types of color mosaics schemes, for example, pseudo-random Bayer pattern, 3-color complementary YeMaCy, mixed primary/complementary colors, and 4-color systems where the fourth color is white or a color with shifted spectral sensitivity.

An example of a Bayer pattern scheme is illustrated in FIG. 1. The example Bayer pattern 100 illustrated in FIG. 1 includes red (R), blue (B) and green (G) pixels and a defective pixel 110. Due to processing imperfections, statistics, etc., a finite number of pixels in an image sensor (e.g., image sensor 1000) may be defective or yield a signal that deviates visibly from the exact pixel value, as exemplified by defective pixel 110. Defective pixel 110 may be corrected for using the method described below in relation to FIGS. 2-3.

Figure 2:
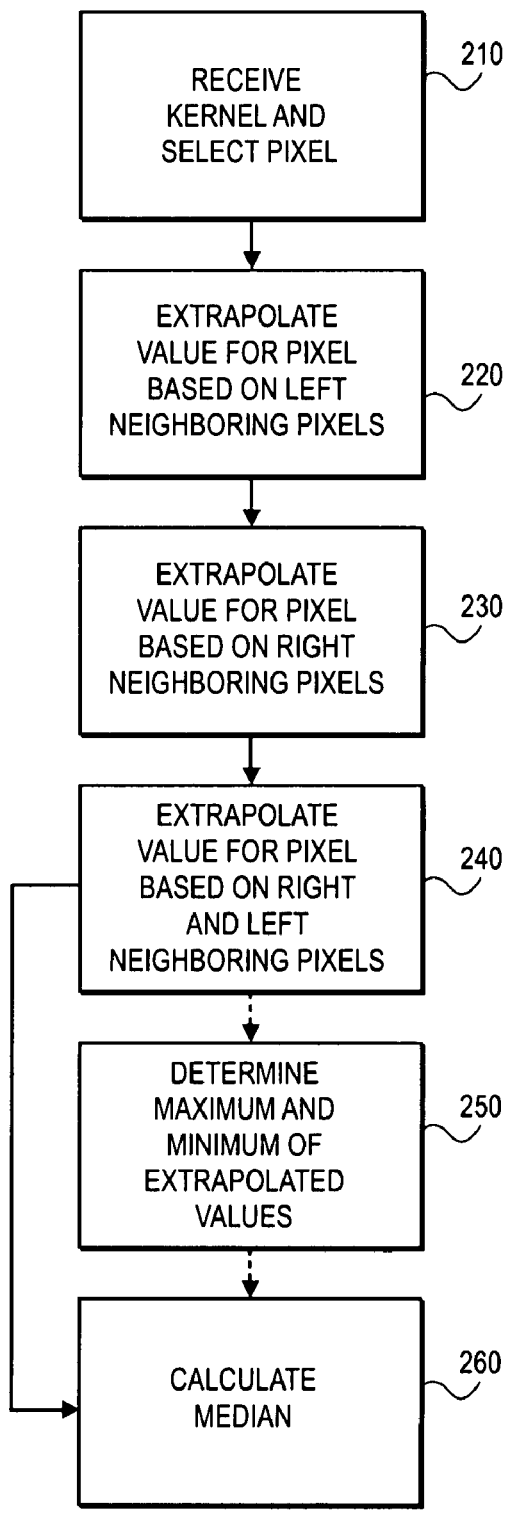
FIG. 2 illustrates one embodiment of a method to correct a defective pixel in an image sensor.
Figure 3:
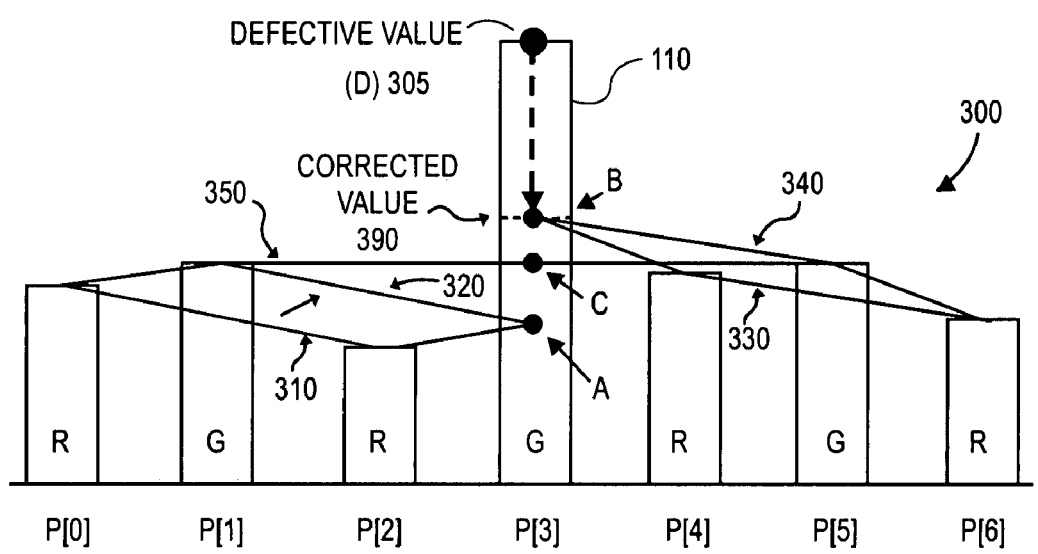
FIG. 3 is a conceptual illustration of exemplary embodiments of the method discussed in relation to FIG. 2.

FIG. 2 illustrates one embodiment of a method to correct a potentially defective pixel in an image sensor. FIG. 3 is a conceptual illustration of the steps of FIG. 2 in regards to exemplary embodiments of the method that utilizes a 7 consecutive pixel values on a line (e.g., row 1022 of FIG. 4) in a Bayer pattern. The kernel 200 illustrated in FIG. 3 includes, in row order, red pixel P[0], green pixel P[1], red pixel P[2], green pixel P[3], red pixel P[4], green pixel P[5] and red pixel P[6]. The heights of the pixel bars represent the pixel values relative to each other.

In this embodiment, the method may include receiving the output of N pixels ("kernel") values from a row in a pixel matrix, step 210, and selecting one of the pixel values to operate on. For ease of discussion purposes, it is assumed in this example that pixel 110 is a defective pixel having a defective value 305. In step 220, a first extrapolated value (A) for pixel 110 is generated using two neighboring pixels to the left of pixel 110. The extrapolated value A may be determined by estimating a pixel value using two pixel neighbors to the left of pixel 110 (the pixel being operated on) of a different color than pixel 110 (e.g., a first left neighboring red pixel P[2] and a second left neighboring red pixel P[0] in the example of FIG. 3). This estimation is illustrated in FIG. 3 by line 310. Because red pixels P[2] and P[0] are of a different color than green pixel 110 being operated on, the estimation is color corrected using a neighboring pixel to the left of pixel 110 of the same color as pixel 110 (e.g., a third left neighboring pixel P[1]). In the embodiment illustrated in FIG. 3, the value of green pixel P[1] is used to offset line 310 to line 320, with line 320 being parallel to line 310. The difference in value between pixels P[0] and P[2] as offset by pixel P[1] is extrapolated value (A).

In step 230, a second extrapolated value (B) for pixel 110 is generated using two pixel neighbors to the right of pixel 110 of a different color than pixel 110 (e.g., a first right neighboring red pixel P[4] and a second right neighboring red pixel P[6] in the example of FIG. 3). This estimation is illustrated in FIG. 3 by line 330. Because red pixels P[4] and P[6] are of a different color than green pixel 110 being operated on, the estimation is color corrected using a neighboring pixel to the right of pixel 110 of the same color as pixel 110 (e.g., a third right neighboring pixel P[5]). The value of green pixel P[5] is used to offset line 330 to line 340, with line 340 being parallel to line 330. The difference in value between pixels P[4] and P[6] as offset by pixel P[5] is extrapolated value (B).

In step 240, a third extrapolate value (C) for pixel 110 is generated by calculating an average of the same color pixel neighbors on either side of pixel 110 (i.e., green pixels P[1] and P[5] in the example of FIG. 3), as represented by line 350. It should be noted that steps 220 to 240 may be performed in parallel or in series in any order.

In one embodiment, in step 250, a maximum extrapolated value of A, B and C is determined: MAX(A,B,C); and a minimum extrapolated value of A, B and C is determined: MIN(A,B,C). In the example of FIG. 3, the maximum of A, B, and C is B, and the minimum of A, B and C is A.

In step 260, a median of multiple values is calculated to determine a corrected value for defective pixel 110. In one embodiment, the median of MAX(A,B,C), MIN(A,B,C), and the defective pixel value (D) 305 is calculated to determine the correct value 390, as illustrated in the example of FIG. 3.

In one embodiment, a scaling factor alpha (a) may be applied to the opposite color neighboring pixels in steps 220 and 230. Alpha may be approximately in a range of 0 to 10. The scaling factor may be used to either emphasize (alpha greater than 1) or de-emphasize (alpha less than 1) the presence of a particular color differing from the defective pixel 110. It should be noted that the method illustrated in the example of FIG. 3 uses an alpha of 1. In one particular embodiment, alpha is selected to be 1.5. The value of alpha may be determined empirically, for example, through experimentation of alpha values that are observed to have a pleasing effect to the eye of one or more persons. Alternatively, other methods may be used to determine an alpha value, for example, The method describe above in relation to FIGS. 2 and 3 may be implemented, for example, with the following algorithm:

```
for (y=y0 ;y<ny;y++) // for all line in the image
    for (x=x0+3;x<nx-3;x++)//for all pixels in a line
    {
        A=(α* (pix (x-1,y))) - (α* (pix (x-3,y))) +pix (x-2,y) ;
        B=(α* (pix (x+1,y))) - (α* (pix (x+3,y))) +pix (x+2,y) ;
        C= (pix (x-2,y) +pix (x+2,y))/2;
        MAX=max3 (A,B,C) ;
        MIN=min3 (A,B,C) ;
        newpix (x,y) = median3 (MAX, MIN, pix (x,y)) ;
    }
``` where=pix(x,y) is the potentially defective pixel value D.

In an alternative embodiment, other steps may be used to determine a corrected value for the defective pixel 110. In one alternative embodiment, for example, the corrected value may be selected to be the median of A, B, C and D. This alternative method may be implemented with the following algorithm:

```
for (y=y0 ;y<ny; y++) //for all lines in the image
    for (x=x0+3;x<nx-3;x++) //for all pixels in the line
    {
        A=(α* (pix (x-1,y))) - (α* (pix (x-3,y))) +pix (x-2,y) ;
        B=(α* (pix (x+1,y))) - (α* (pix (x+3,y))) +pix (x+2,y) ;
        C= (pix (x-2,y) +pix (x+2,y))/2;
        newpix(x,y) = median(A, B, C, pix(x,y));
    }
```

Yet other variants to the above algorithms may be used to implement alternative methods of generating the replacement value for the defective pixel, for example, using averaging of some of the value described above.

It should be noted that the two neighboring pixels of a different color and the one neighboring pixel of the same color as defective pixel 110 may be the nearest neighbors (as illustrated by the exemplary embodiment described in relation to FIGS. 2 and 3). Alternatively, farther neighboring pixels of pixel 110 may be used. In yet another embodiment, a greater number of neighboring pixels may be used to generate extrapolated value A and/or extrapolated value B. Accordingly, although a particular embodiment using a 7-pixel "kernel" is discussed above, other size kernels may be used in alternative embodiments. In one embodiment, the kernel may include consecutive pixels. Alternatively, the kernel may include one or more non-consecutive pixels. The above method may be performed for every pixel output received (or sub-set thereof) in a stream from an imaging core.

In yet another embodiment, the calculation of one or more of the A, B and C values may be performed using a different alpha value than is used to perform another calculation. In addition, different alpha values may be used within one or more of the A, B and C parameters for scaling each side, i.e., left (minus) and right (plus) of the defective pixel.

In the above implementation, A and B are the extrapolated values coming from the left and the right, respectively, of the potentially defective pixel. In another embodiment, such extrapolated values can be taken from more than the two discussed left and right directions, e.g., also from top, bottom or diagonal directions.

The method and apparatus described herein may be used to continually correct defective pixels in a video stream output from an image sensor. Although discussed above in relation to a color image, the methods and apparatus discussed herein can also be used to correct defective pixels in a black and white image.

Figure 4:
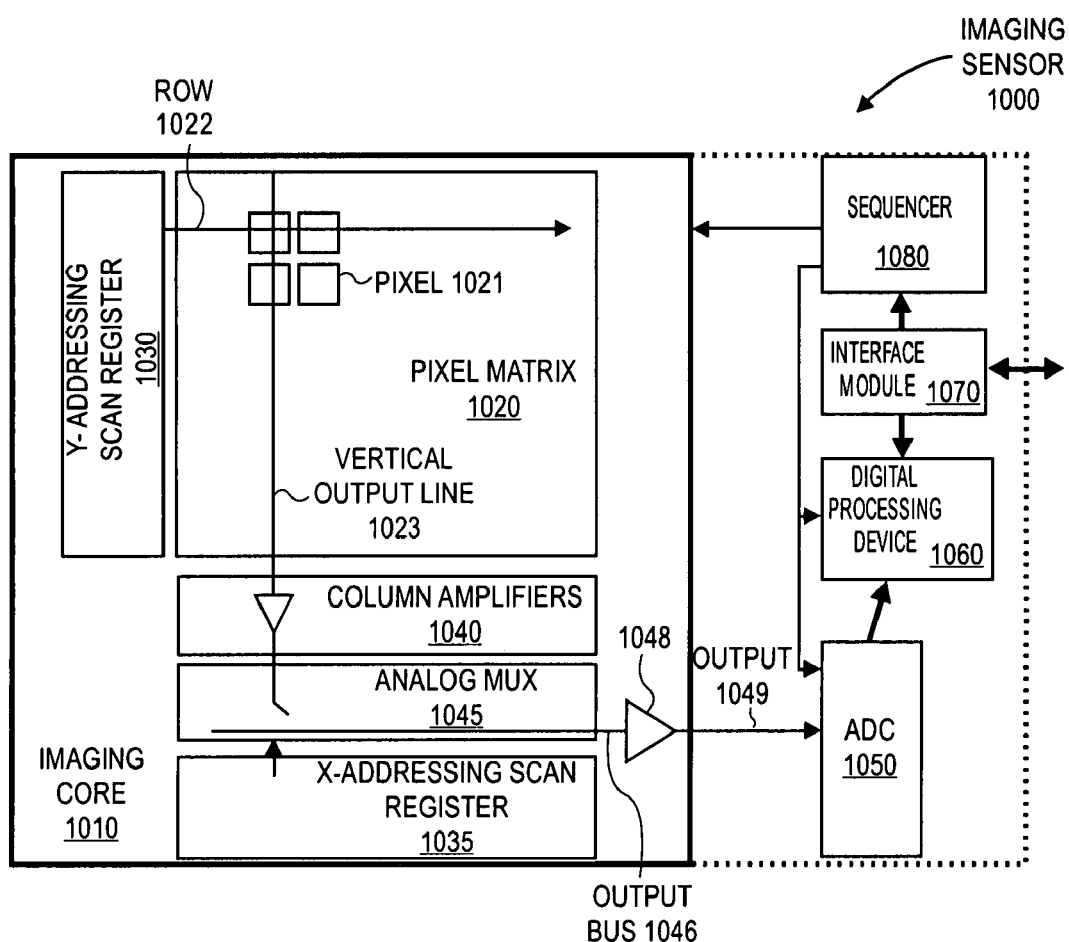
FIG. 4 illustrates one embodiment of an image sensor.

FIG. 4 illustrates one embodiment of an image sensor implementing the method and apparatus described herein. Image sensor 1000 includes an imaging core 1010 and components associated with the operation of the imaging core. The imaging core 1010 includes a pixel matrix 1020 having an array of pixels (e.g., pixel 1021) and the corresponding driving and sensing circuitry for the pixel matrix 1020. The driving and sensing circuitry may include: one or more scanning registers 1035, 1030 in the X- and Y-direction in the form of shift registers or addressing registers; buffers/line drivers for the long reset and select lines; column amplifiers 1040 that may also contain fixed pattern noise (FPN) cancellation and double sampling circuitry; and analog multiplexer (mux) 1045 coupled to an output bus 1046. FPN has the effect that there is non-uniformity in the response of the pixels in the array. Correction of this non-uniformity needs some type of calibration, for example, by multiplying or adding/subtracting the pixel's signals with a correction amount that is pixel dependent. Circuits and methods to cancel FPN may be referred to as correlated double sampling or offset compensation and are known in the art; accordingly, a detailed description is not provided.

The pixel matrix 1020 may be arranged in N rows of pixels by N columns of pixels (with N≧1), with each pixel (e.g., pixel 1021) is composed of at least a photosensitive element and a readout switch (not shown). A pixel matrix is known in the art; accordingly, a more detailed description is not provided.

The Y-addressing scan register(s) 1030 addresses all pixels of a row (e.g., row 1022) of the pixel matrix 1020 to be read out, whereby all selected switching elements of pixels of the selected row are closed at the same time. Therefore, each of the selected pixels places a signal on a vertical output line (e.g., line 1023), where it is amplified in the column amplifiers 1040. An X-addressing scan register(s) 1035 provides control signals to the analog multiplexer 1045 to place an output signal (amplified charges) of the column amplifiers 1045 onto output bus 1046. The output bus 1046 may be coupled to a buffer 1048 that provides a buffered, analog output 1049 from the imaging core 1010.

The output 1049 from the imaging core 1010 is coupled to an analog-to-digital converter (ADC) 1050 to convert the analog imaging core output 1049 into the digital domain. The ADC 1050 is coupled to a digital processing device 1060 to process the digital data received from the ADC 1050 (such processing may be referred to as imaging processing or post-processing). The digital processing device 1060 may include one or more general-purpose processing devices such as a microprocessor or central processing unit, a controller, or the like. Alternatively, digital processing device 1060 may include one or more special-purpose processing devices such as a digital signal processor (DSP), an application specific integrated circuit (ASIC), a field programmable gate array (FPGA), or the like. Digital processing device 1060 may also include any combination of a general-purpose processing device and a special-purpose processing device.

The digital processing device 1060 is coupled to an interface module 1070 that handles the information input/ output (I/O) exchange with components external to the image sensor 1000 and takes care of other tasks such as protocols, handshaking, voltage conversions, etc. The interface module 1070 may be coupled to a sequencer 1080. The sequencer 1080 may be coupled to one or more components in the image sensor 1000 such as the imaging core 1010, digital processing device 1060, and ADC 1050. The sequencer 1080 may be a digital circuit that receives externally generated clock and control signals from the interface module 1070 and generates internal pulses to drive circuitry in the imaging sensor for example, the imaging core 1010, ADC 1050, etc.

In one embodiment, the method described herein may be implemented in firmware or software embodied onto a machine-readable medium (e.g., software) to be executed by digital processing device, for example, digital processing device 1060. In one embodiment, the imaging sensor 1000 may also include a memory (not shown) coupled to the digital processing device 1060 to store data which when accessed by digital processing device 1060 causes the digital processing device 1060 to perform the method described herein. In yet another embodiment, the method discussed herein may be implemented with one or more components (e.g., a digital processing device and memory) outside of the image sensor 1000.

A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; DVD's, electrical, optical, acoustical or other form of propagated signals (e.g., carrier waves, infrared signals, digital signals, EPROMs, EEPROMs, FLASH, magnetic or optical cards, or any type of media suitable for storing electronic instructions. The information representing the apparatuses and/or methods stored on the machine-readable medium may be used in the process of creating the apparatuses and/or methods described herein.

Figure 5:
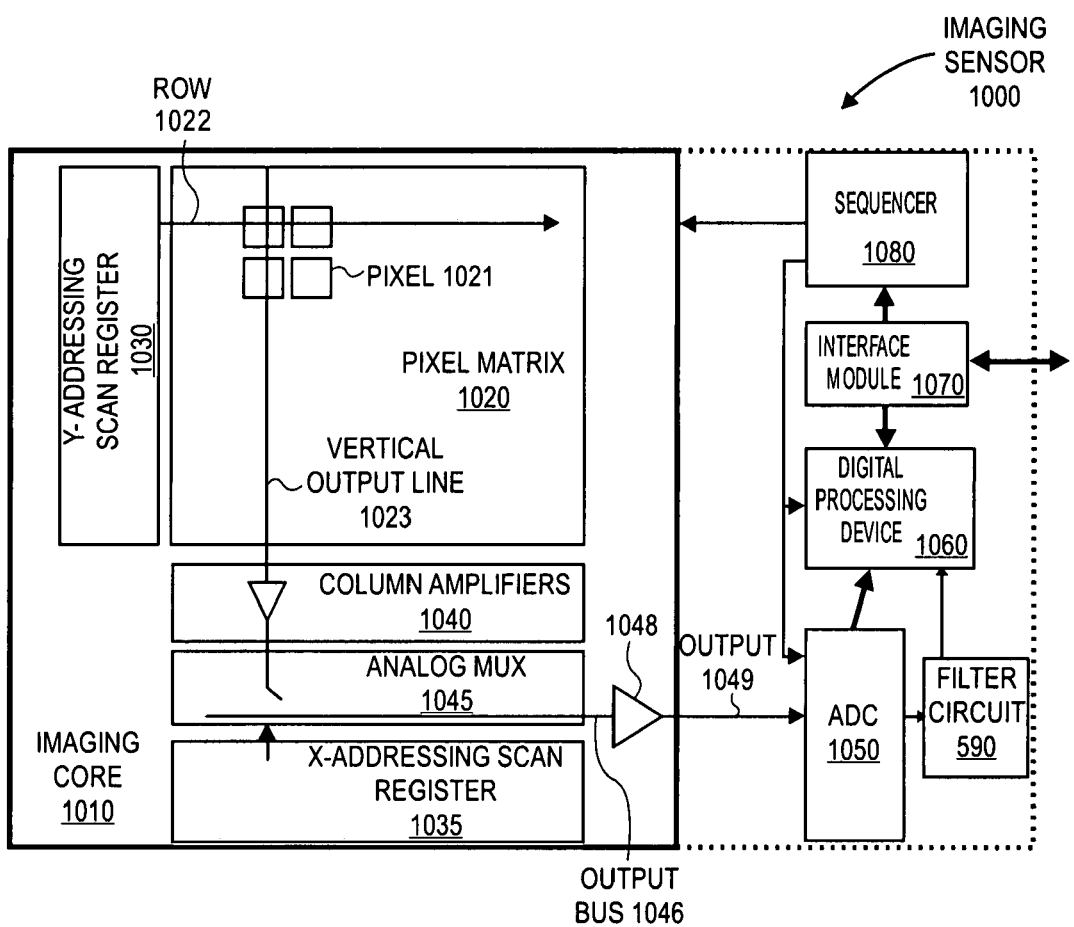
FIG. 5 illustrates another embodiment of an image sensor.
Figure 6:
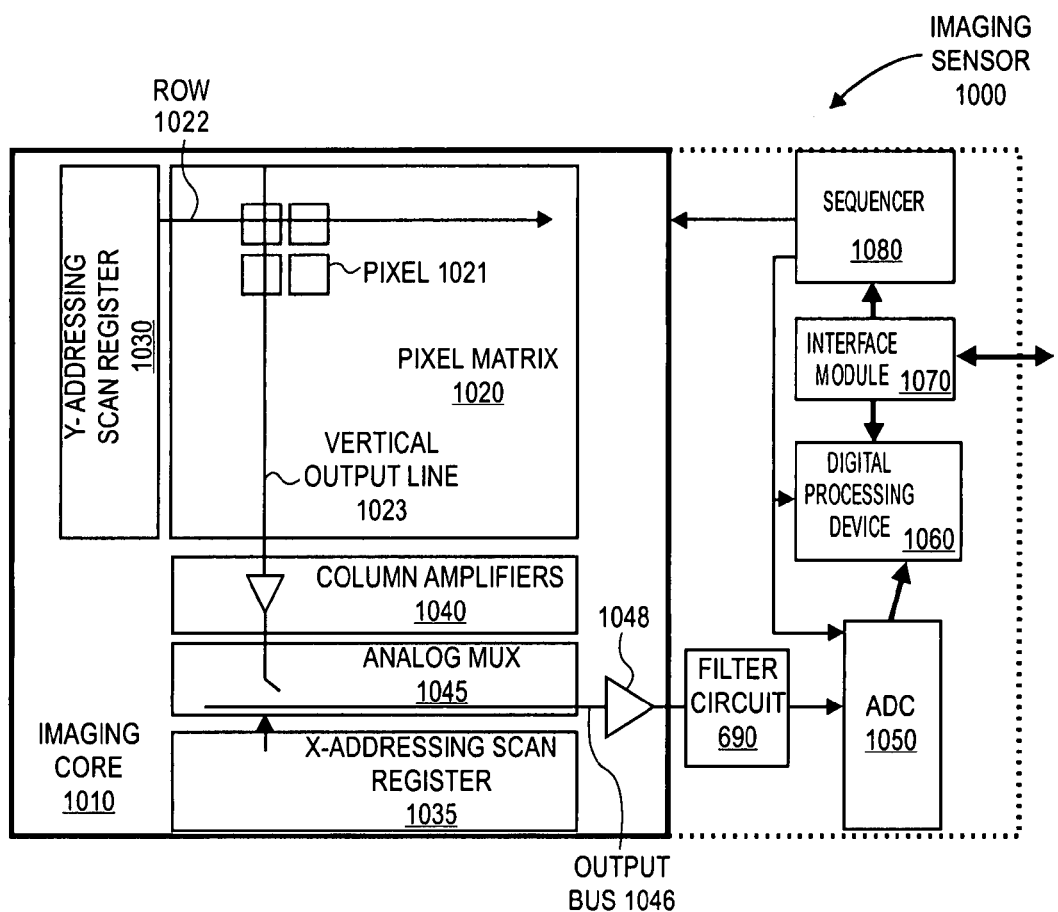
FIG. 6 illustrates yet another embodiment of an image sensor.

In an alterative embodiment, the method discussed above may be implemented in hardware, for example, in what may be referred to as a filtering circuit. The filtering circuit may operate in the digital domain. Accordingly, a filtering circuit 590 implementing the methods discussed above may be located between the ADC 1050 and the digital processing device 1060, as illustrated in FIG. 5. In one embodiment, the operation of such a filter circuit may be implemented with the digital processing device 1060 as discussed above. Alternatively, the method discussed above may be performed in the analog domain and, correspondingly, a filtering circuit 690 may be located between the output of the imaging core 1010 and the ADC 1050, as illustrated in FIG. 6.

The image sensor 1000 discussed herein may be used in various applications. In one embodiment, the image sensor 1000 discussed herein may be used in a digital camera system, for example, for general-purpose photography (e.g., camera phone, still camera, video camera) or special-purpose photography. Alternatively, the image sensor 1000 discussed herein may be used in other types of applications, for example, machine vision, document scanning, microscopy, security, biometry, etc.

While some specific embodiments of the invention have been shown the invention is not to be limited to these embodiments. The invention is to be understood as not limited by the specific embodiments described herein, but only by scope of the appended claims.

What is claimed is:

1. A method, comprising:
   receiving a kernel having a potentially defective pixel having a potentially defective value, the potentially defective pixel being of a first color;
   extrapolating a first value for the potentially defective pixel using first and second left neighboring pixels of the potentially defective pixel, the first and second left neighboring pixels having a different color than the first color, and using a third left neighboring pixel having the first color;
   extrapolating a second value for the potentially defective pixel using first and second right neighboring pixels of the potentially defective pixel in the kernel, the first and second right neighboring pixels having a different color than the first color, and using a third right neighboring pixel having the first color; and
   generating a corrected value for the potentially defective pixel based on the extrapolation of the first value and the extrapolation of the second value.

2. The method of claim 1, further comprising calculating an average of the third left neighboring pixel and the third right neighboring pixel, and wherein the corrected value for the potentially defective pixel is further generated based on the calculation of the average.

3. The method of claim 2, wherein the first and second left neighboring pixels have a same color, wherein the first and second right neighboring pixels have a same color, wherein extrapolating the first value comprises:
   calculating a first difference between the first and second left neighboring pixels; and
   offsetting the first difference using the third left neighboring pixel; wherein extrapolating the second value comprises:
   calculating a second difference between the first and second right neighboring pixels; and
   offsetting the second difference using the third right neighboring pixel to generate the first extrapolate value; and
   wherein generating the corrected value futher comprises calculating the meadian of the first extrapolated value, the second extrapolated value, the average and the potentially defective value.

4. The method of claim 1, wherein the first left neighboring pixel, the third left neighboring pixel, the second left neighboring pixel, the potentially defective pixel, the first right neighboring pixel, the third right neighboring pixel, and the second right neighboring pixel are consecutive in the kernel.

5. The method of claim 1, wherein the first and second left neighboring pixels and the first and second right neighboring pixels have a same color, wherein extrapolating the first value comprises:
   calculating a first difference between the first and second left neighboring pixels; and
   offsetting the first difference using the third left neighboring pixel; wherein extrapolating the second value comprises:
   calculating a second difference between the first and second right neighboring pixels; and
   offsetting the second difference using the third right neighboring pixel to generate the first extrapolate value.

6. The method of claim 5, wherein generating the corrected value further comprises calculating the median of the first extrapolated value, the second extrapolated value and the potentially defective value.

7. The method of claim 5, further comprising:
   determining a maximum of the first extrapolated value, the second extrapolated value and the average to generate a maximum value;
   determining a minimum of the first extrapolated value, the second extrapolated value and the average to generate a minimum value; and
   wherein generating the corrected value comprises calculating a median of at least the maximum value, the minimum value and the potentially defective value.

8. The method of claim 1, wherein extrapolating the first value comprises:
   applying a first scaling factor to the first left neighboring pixel to generate a scaled first left neighboring pixel value;
   applying a second scaling factor to the second left neighboring pixel to generate a scaled second left neighboring pixel value;
   calculating a first difference between the scaled first left neighboring pixel value and the scaled second left neighboring pixel; and
   offsetting the first difference using the third left neighboring pixel to generate the first extrapolated value.

9. The method of claim 8, wherein extrapolating the second value comprises:
   applying a third scaling factor to the first right neighboring pixel to generate a scaled first right neighboring pixel value;
   applying a fourth scaling factor to the second right neighboring pixel to generate a scaled second right neighboring pixel value;
   calculating a second difference between the scaled first right neighboring pixel value and the scaled second right neighboring pixel; and
   offsetting the second difference using the third right neighboring pixel to generate the second extrapolated value.

10. The method of claim 9, wherein generating the corrected value further comprises calculating the median of the first extrapolated value, the second extrapolated value and the potentially defective value.

11. The method of claim 10, wherein the first left neighboring pixel, the third left neighboring pixel, the second left neighboring pixel, the potentially defective pixel, the first right neighboring pixel, the third right neighboring pixel, and the second right neighboring pixel are consecutive in the kernel.

12. The method of claim 9, further comprising:
   determining a maximum of the first extrapolated value, the second extrapolated value and the average to generate a maximum value;
   determining a minimum of the first extrapolated value, the second extrapolated value and the average to generate a minimum value; and
   wherein generating the corrected value comprises calculating a median of at least the maximum value, the minimum value and the potentially defective value.

13. An article of manufacture, comprising:
   a computer readable medium including data that, when accessed by a computer, cause the computer to perform operations comprising:
   receiving a kernel having a potentially defective pixel having a potentially defective value, the potentially defective pixel being of a first color;
   extrapolating a first value for the potentially defective pixel using first and second left neighboring pixels of the potentially defective pixel, the first and second left neighboring pixels having a different color than the first color, and using a third left neighboring pixel, having the first color;
   extrapolating a second value for the potentially defective pixel using first and second right neighboring pixels of the potentially defective pixel in the kernel, the first and second right neighboring pixels having a different color than the first color, and using a third right neighboring pixel, having the first color; and
   generating a corrected value for the potentially defective pixel based on the extrapolation of the first value and the extrapolation of the second value.

14. The article of manufacture of claim 13, wherein the data, when accessed by the computer, cause the computer to perform operations further comprising calculating an average of the third left neighboring pixel and the third right neighboring pixel, and wherein the corrected value for the potentially defective pixel is further generated based on the calculation of the average.

15. The article of manufacture of claim 14, wherein extrapolating the first value comprises:
   calculating a first difference between the first and second left neighboring pixels; and
   offsetting the first difference using the third left neighboring pixel; wherein extrapolating the second value comprises:
   calculating a second difference between the first and second right neighboring pixels; and
   offsetting the second difference using the third right neighboring pixel to generate the first extrapolate value;
   and wherein generating the corrected value comprises calculating a median of the first extrapolated value, the second extrapolated value, the average and the potentially defective value.

16. The article of manufacture of claim 13, wherein the data, when accessed by the computer, cause the computer to perform operations further comprising:
   calculating an average of the third left neighboring pixel and the third right neighboring pixel, and wherein the corrected value for the potentially defective pixel is further generated based on the calculation of the average; and
   wherein extrapolating the first value comprises:
   applying a first scaling factor to the first left neighboring pixel to generate a scaled first left neighboring pixel value;
   applying a second scaling factor to the second left neighboring pixel to generate a scaled second left neighboring pixel value;
   calculating a first difference between the scaled first left neighboring pixel value and the scaled second left neighboring pixel; and
   offsetting the first difference using the third left neighboring pixel to generate the first extrapolated value; and
   wherein extrapolating the second value comprises:
   applying a third scaling factor to the first right neighboring pixel to generate a scaled first right neighboring pixel value;
   applying a fourth scaling factor to the second right neighboring pixel to generate a scaled second right neighboring pixel value;
   calculating a second difference between the scaled first right neighboring pixel value and the scaled second right neighboring pixel;

offsetting the second difference using the third right neighboring pixel to generate the second extrapolated value; and wherein generating the corrected value further comprises calculating the median of the first extrapolated value, the second extrapolated value, the average and the potentially defective value.

17. An apparatus, comprising:

an imaging core having a pixel matrix; and a filter circuit coupled to receive a kernel from the imaging core, the kernel having a potentially defective pixel with a potentially defective value, the potentially defective pixel being of a first color, wherein the filter circuit is configured to extrapolate a first value for the potentially defective pixel using first and second left neighboring pixels of the potentially defective pixel in the kernel, the first and second left neighboring pixels having a different color than the first color, and using a third left neighboring pixel, having the first color;

wherein the filter circuit is further configured to extrapolate a second value for the potentially defective pixel using first and second right neighboring pixels of the potentially defective pixel in the kernel, the first and second right neighboring pixels having a different color than the first color, and using a third right neighboring pixel, having the first color; and wherein the filter circuit is further configured to generate a corrected value for the potentially defective pixel based on the extrapolation of the first value and the extrapolation of the second value.

18. The apparatus of claim 17, wherein the filter circuit is further configured to calculate an average of the third left neighboring pixel and the third right neighboring pixel and wherein the filter circuit is further configured to generate the corrected value based on the extrapolation of the first value, the extrapolation of the second value, and the calculation of the average.

19. The apparatus of claim 17, further comprising an analog-to-digital converter coupled to the imaging core, wherein the filter circuit is coupled to receive digital output of the analog-to-digital converter.

20. The apparatus of claim 17, wherein the filter circuit comprises a digital processing device and wherein the apparatus further comprises an analog-to-digital converter coupled to the imaging core and to the digital processing device, wherein the digital processing device is coupled to receive the kernel from the imaging core through the analog-to-digital converter.

* * * * *